May 5, 1942.          R. E. RAMBO ET AL          2,282,243
                    SUBMERGED MOTOR ASSEMBLY
                      Filed March 16, 1940
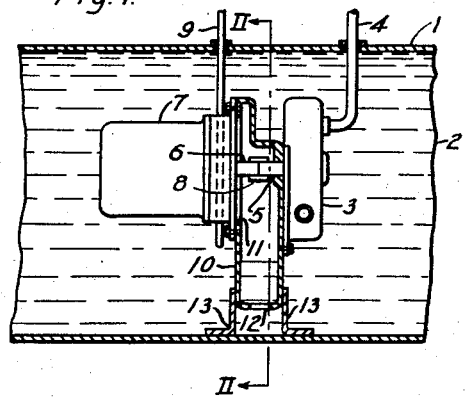
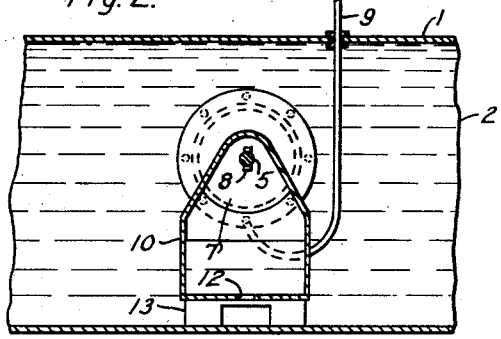
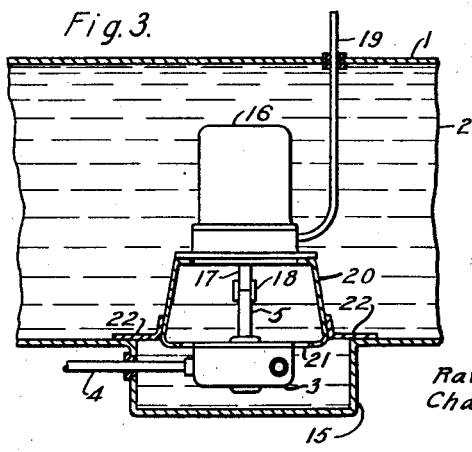
WITNESSES:
N. F. Susser
F. P. Lyle
INVENTORS
Rawdon E. Rambo and
Charles F. Jenkins.
BY
    Buchanan
ATTORNEY Patented May 5, 1942

2,282,243

UNITED STATES PATENT OFFICE 2,282,243

SUBMERGED MOTOR ASSEMBLY

Rawdon E. Rambo, Wilkinsburg, and Charles F. Jenkins, Forest Hills, Pa., assignors to Westinghouse Electric & Manufacturing Company, East Pittsburgh, Pa., a corporation of Pennsylvania Application March 16, 1940, Serial No. 324,380

7 Claims. (Cl. 172—36)

The present invention relates to electric motors, and more particularly to a motor driven assembly which is intended to operate submerged in a liquid.

In handling liquids, it is often necessary or desirable to use a pump which is submerged in the liquid. In such cases it is usually desirable or convenient to drive the pump by a direct connected electric motor which is also submerged in the liquid. One example of such an arrangement is found in aircraft, in which the fuel tanks are located in the wings of the airplane and the gasoline is pumped to the motors by means of pumps and direct connected motors which are placed inside the tanks. There are many other similar applications in which submerged motor driven pumps are used for handling liquid fuels, acids and other liquids.

When an electric motor is used in this way, it is, of course, necessary to protect the motor against entrance of the liquid, since it would have a harmful effect on the windings and, in many cases, on the bearings of the motor. In addition, the motor must be explosion-proof if the liquid or its vapor is inflammable or explosive, as in the case of gasoline. For this reason, such motors usually have a liquid-tight explosion-proof housing, and the liquid is prevented from flowing into the motor around the shaft by means of a packing gland or other mechanical sealing device. The use of such a gland, however, causes considerable loss from friction, thus requiring a larger and heavier motor than would otherwise be needed. There is also the danger that a leak may develop because of wear of the packing after the motor has been in service over a period of time. If the motor is directly connected to a pump, there is also danger that the packing gland of the pump may leak and allow the liquid to flow into the motor. For these reasons, the use of a packing gland is not entirely satisfactory.

The object of the present invention is to provide an electric motor driven assembly for operation submerged in a liquid in which the liquid is prevented from flowing into the motor without the use of packing glands or mechanical seals.

More specifically, the object of the invention is to provide an electric motor driven assembly for operation submerged in a liquid in which an air chamber encloses all points at which liquid could flow into the motor and prevents the liquid from reaching these points, thus positively protecting the motor against the liquid.

A further object of the invention is to provide an electric motor assembly for operation submerged in a liquid in which the liquid is prevented from entering the motor by means of an air chamber which also acts as an expansion chamber to relieve the pressure in the event of a gas explosion inside the motor.

Other objects and advantages of the invention will be apparent from the following detailed description, taken in connection with the accompanying drawing, in which:

Figure 1 is a side elevational view, partly in section, of a submerged motor assembly;

Fig. 2 is a transverse sectional view taken approximately on the line II—II of Fig. 1; and Fig. 3 is a view similar to Fig. 1 showing the invention as applied to a vertically mounted assembly.

Figure 1 shows a motor driven pump assembly which is submerged in a tank 1 filled with a liquid 2. The tank 1 may, for example, be an airplane fuel tank which is mounted in the wing of the plane with a pump placed in the tank to supply the fuel to the airplane motors, or it may be a tank of any other type from which liquid is to be pumped. The pump is indicated at 3 and may be of any desired type having a suitable housing to permit it to operate submerged. The pump discharges into a fuel line 4 which passes through the wall of the tank to convey the fuel to the desired point of use. The pump has a shaft 5 which is direct connected to the shaft 6 of an electric motor 7 by means of a suitable coupling 8. The motor 7 may be of any suitable type and is completely enclosed in a liquid-tight housing, which is preferably also explosion-proof if the liquid 2 is inflammable or forms an inflammable or explosive vapor. The motor leads are brought out of the tank through a conduit 9 which is sealed to the motor housing with a liquid-tight joint and extends through the wall of the tank.

The shaft 6 of the motor extends through one end of the housing and is supported in a suitable bearing therein, and it is necessary to prevent the liquid from flowing into the motor along the shaft. It is undesirable to use a mechanical seal or packing gland for this purpose since, as explained above, such devices greatly increase the friction loss and also necessarily involve the danger of leakage because of wear of the packing after the motor has been in service. According to the present invention, the liquid is prevented from flowing into the motor by providing an air chamber which prevents the liquid from reaching the shaft, or any points at which it might flow into the housing. The air chamber is preferably formed by providing a housing 10 which is secured to the housing of the pump 3 or which may be formed integral with it. This housing has an opening 11 in its side wall opposite to the pump in which the motor 7 is fastened, the joint between the motor and the housing 10 being made liquid-tight by means of a gasket or in any other desired manner. The housing 10 has an opening 12 at the bottom through which liquid may enter, and the entire assembly may be supported on the bottom of the tank by means of brackets 13 or in any other suitable manner.

As shown more clearly in Fig. 2, the shape of the housing 10 is such that the volume of its upper portion is much less than that of the lower portion, and the opening 11 in which the motor 7 is secured is located in the upper portion of the housing. When the tank 1 is filled with liquid, the liquid will enter the housing 10 through the opening 12 at the bottom and will rise in it until the pressure of the air trapped in the upper portion of the housing is equal to the hydrostatic pressure of the liquid in the tank. The upper part of the housing 10 is so proportioned that the pressure of this air will keep the level of the liquid in the housing well below any point at which liquid could flow into the motor, and thus an air chamber is provided enclosing all such points, which effectively prevents any liquid from entering the motor.

It will be observed that the effectiveness of this air chamber is independent of the position of the assembly so that it is suitable for use in applications where the tank may be moved or turned in any direction, as in the case of an airplane fuel tank, since the air trapped in the housing 10 will prevent the liquid from reaching the motor in any position of the housing. The air chamber formed by the housing 10 also serves as an expansion chamber in the event of an explosion in the motor. Thus, in the case of an inflammable liquid with an explosive vapor, such as gasoline, the vapor may enter the motor and form an explosive mixture therein which might be ignited and cause an explosion. In case of such an explosion, the housing 10 provides an expansion chamber which permits the gases of the explosion to expand and thus minimize the damage that may be caused, since the gases can escape through the hole 12 and relieve the pressure.

The invention can be applied to any type of motor driven assembly, either horizontal or vertical. Thus, Fig. 3 shows the invention as applied to a vertically positioned motor driven pump. This arrangement is advantageous in many cases, since it permits the pump to be placed in the lowest position in the tank. As shown in Fig. 3, the pump 3 is placed in a sump 15 in the bottom of the tank 1 and is driven by a vertical motor 16 having a shaft 17 which is direct connected to the shaft 5 of the pump by a coupling 18. The motor 16 has a housing which is similar to that of the motor 7 previously described, and the leads are brought out of the tank through a conduit 19 which is sealed to the motor housing. As before, an air chamber is provided between the pump and the motor by a housing 20 which is formed integral with the housing of the pump 3, or which may be formed as a separate member and attached to the pump. The housing 20 is similar to the housing 10 and has an opening in its upper wall in which the motor 16 is secured with a liquid-tight joint. Openings 21 are provided in the bottom of the housing 20 through which the liquid may enter it. The entire assembly may be supported on the bottom wall of the tank 1 by means of brackets 22 or in any other suitable manner. As previously described, the housing 20 is shaped so that it is smaller at its upper portion in which the motor 16 is secured than at the bottom.

It will be obvious that the operation of this embodiment of the invention is the same as that previously described. When the tank is filled, liquid will enter the housing 20 through the openings 21 and will rise in the housing until the pressure of the air trapped in it is equal to the pressure of the liquid in the tank. The trapped air will keep the level of the liquid in the housing well below any point at which it could enter the motor and thus the motor is positively protected from the liquid without the use of any mechanical seal or packing gland.

It will be apparent that various modifications are possible without departing from the spirit of the invention. Thus, the housing 10 may be closed at the bottom so that liquid is prevented from entering it at all and a completely enclosed air chamber is provided which effectively prevents access of the liquid to any point at which it might enter the motor. When a completely closed air chamber is used, it may be filled with an inert gas to prevent the danger of explosion. The housing 10 may be arranged in any desired manner to provide an air chamber which encloses the motor shaft and any other points at which liquid could flow into the motor to prevent access of the liquid to any such points.

The device driven by the motor is not necessarily a pump but may be any other device which it is desired to operate submerged in a liquid, and although the invention has been described with reference to an airplane fuel tank as an example of one use for which it is well adapted, it will be obvious that its application is general. Thus, it may be used in connection with the handling of any type of liquid, such as fuels, acids or other liquids which would be harmful to the motor. The invention may also be used to advantage in connection with deep well pumps, and for many other similar applications.

It should now be obvious that a motor assembly has been provided for operation submerged in a liquid in which the motor is protected against entrance of the liquid without the use of any mechanical seal or packing gland, thus avoiding the danger of leakage after wear of the seal and eliminating the friction losses caused by such a seal, so that a smaller and lighter motor can be used, which is an important consideration in aircraft applications. The air chamber by which these results are obtained provides a positive sealing means for keeping the liquid out of the motor, and it also provides an expansion chamber in the event of an explosion in the motor when it is used with inflammable or explosive liquids, which is a safety feature of considerable importance.

As explained above, the invention is not restricted to the exact details of construction shown in the drawing but is capable of many modifications and embodiments to suit the particular conditions of use. The invention is not limited, therefore, to the exact arrangement shown and described, but in its broadest aspect it includes all equivalent embodiments and modifications which come within the scope of the appended claims.

We claim as our invention:

1. An electric motor driven assembly adapted to operate submerged in a liquid comprising an electric motor having a liquid-tight housing and a shaft extending from one end of the housing, a driven device connected to the motor shaft to be driven thereby, and a housing disposed between the motor and the driven device and enclosing the space between them around the shaft, the housing having a lower portion which extends a substantial distance below the motor and the driven device and having an opening only at its bottom.

2. An electric motor driven assembly adapted to operate submerged in a liquid comprising an electric motor having a liquid-tight housing and a shaft extending from one end of the housing, a driven device connected to the motor shaft to be driven thereby, and a housing disposed between the motor and the driven device and enclosing the space between them around the shaft, the housing having a lower portion which extends a substantial distance below the motor and the driven device and having an opening only at its bottom, the upper portion of the housing which encloses the shaft being of smaller volume than the lower portion.

3. An electric motor driven assembly adapted to operate submerged in a liquid comprising an electric motor having a liquid-tight housing and a shaft extending from one end of the housing, a driven device connected to the motor shaft to be driven thereby, and a housing disposed between the motor and the driven device and enclosing the space between them around the shaft, said housing being closed at its upper end to form an air chamber around the shaft, and the motor and driven device being positioned at the upper end of the housing on opposite sides thereof.

4. An electric motor driven assembly adapted to operate submerged in a liquid comprising an electric motor having a liquid-tight housing and a shaft extending from one end of the housing, a driven device connected to the motor shaft to be driven thereby, and a housing disposed between the motor and the driven device and enclosing the space between them around the shaft, said housing being closed at its upper end to form an air chamber around the shaft, and the motor and driven device being positioned at the upper end of the housing on opposite sides thereof, the housing having an opening only at its bottom.

5. An electric motor driven assembly adapted to operate submerged in a liquid comprising an electric motor having a liquid-tight housing and a shaft extending from one end of the housing, a driven device connected to the motor shaft to be driven thereby, and a housing disposed between the motor and the driven device and enclosing the space between them around the shaft, said housing being closed at its upper end to form an air chamber around the shaft, and the motor and driven device being positioned at the upper end of the housing on opposite sides thereof, the upper part of the housing which encloses the shaft being of smaller volume than the lower part and the housing having an opening only at its bottom.

6. A submerged motor-driven assembly comprising a housing member, a driven device at one side of the housing member, said housing member having an opening in one wall thereof at the side opposite to the driven device, and an electric motor secured in said opening with a liquid-tight seal and having a shaft which is connected to the driven device within the housing, said housing extending below the motor and driven device and having an opening in its bottom.

7. A submerged motor-driven assembly comprising a housing member, a driven device at one side of the housing member, said housing member having an opening in one wall thereof at the side opposite to the driven device, and an electric motor secured in said opening with a liquid-tight seal and having a shaft which is connected to the driven device within the housing, said housing having a lower portion which extends below the motor and driven device and which is of larger cross-section than the upper portion, and having an opening in its bottom.

RAWDON E. RAMBO.
CHARLES F. JENKINS.